United States Patent
Zhang et al.

(10) Patent No.: US 10,856,264 B2
(45) Date of Patent: Dec. 1, 2020

(54) CROSS BAND CARRIERS

(71) Applicant: Qualcomm Incorporated, San Diego, CA (US)

(72) Inventors: Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/126,787

(22) Filed: Sep. 10, 2018

(65) Prior Publication Data

US 2019/0098607 A1 Mar. 28, 2019

Related U.S. Application Data

(60) Provisional application No. 62/562,926, filed on Sep. 25, 2017.

(51) Int. Cl.
| | |
|---|---|
| *H04W 4/00* | (2018.01) |
| *H04W 72/02* | (2009.01) |
| *H04L 5/00* | (2006.01) |
| *H04W 16/14* | (2009.01) |
| *H04W 72/04* | (2009.01) |
| *H04W 74/00* | (2009.01) |
| *H04L 1/18* | (2006.01) |

(52) U.S. Cl.
CPC ............ *H04W 72/02* (2013.01); *H04L 5/001* (2013.01); *H04L 5/0053* (2013.01); *H04L 5/0098* (2013.01); *H04W 16/14* (2013.01); *H04W 72/048* (2013.01); *H04W 72/0413* (2013.01); *H04L 1/1887* (2013.01); *H04W 72/0453* (2013.01); *H04W 74/004* (2013.01); *H04W 74/006* (2013.01)

(58) Field of Classification Search
CPC ............... H04W 72/02; H04W 72/048; H04W 72/0413; H04W 16/14; H04L 5/001; H04L 5/0053; H04L 5/0098
USPC .................................. 370/329–330, 335–345
See application file for complete search history.

(56) References Cited

U.S. PATENT DOCUMENTS

| | | | |
|---|---|---|---|
| 10,362,525 B2* | 7/2019 | Miao | H04B 7/15542 |
| 2012/0063357 A1 | 3/2012 | Etemad et al. | |
| 2014/0341135 A1 | 11/2014 | Bhushan et al. | |
| 2017/0105152 A1* | 4/2017 | Lou | H04L 5/14 |
| 2017/0142632 A1 | 5/2017 | Panchal et al. | |
| 2018/0234960 A1* | 8/2018 | Nagaraja | H04B 7/0695 |
| 2018/0278467 A1* | 9/2018 | John Wilson | H04L 41/0654 |
| 2018/0287686 A1* | 10/2018 | John Wilson | H04B 7/0695 |
| 2019/0059110 A1* | 2/2019 | Zhang | H04W 16/14 |
| 2019/0257933 A1* | 8/2019 | Nath | G01S 7/006 |

(Continued)

FOREIGN PATENT DOCUMENTS

WO     2017083514 A1     5/2017

OTHER PUBLICATIONS

International Search Report and Written Opinion—PCT/US2018/052267—ISA/EPO—dated Jan. 16, 2019.

*Primary Examiner* — Thai D Hoang
(74) *Attorney, Agent, or Firm* — Linda G. Gunderson

(57) ABSTRACT

Methods, systems, and devices for wireless communication are described. Downlink carriers in the millimeter wave spectrum may be paired with one or more carriers in a lower frequency spectrum, such as one or more uplink carriers in a sub-6 GHz band.

25 Claims, 7 Drawing Sheets

(56) References Cited

U.S. PATENT DOCUMENTS

2019/0373450 A1* 12/2019 Zhou ................. H04W 74/0833
2020/0100118 A1* 3/2020 Sun ...................... H01Q 3/2605

* cited by examiner

CROSS BAND CARRIERS

CROSS REFERENCE TO RELATED APPLICATIONS

This application claims priority to U.S. Provisional Patent Application Ser. No. 62/562,926 entitled CROSS BAND CARRIERS, filed on Sep. 25, 2017, which is incorporated by reference herein in its entirety.

BACKGROUND

The following relates generally to wireless communication, and more specifically to uplink and downlink cross-band carriers.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices. Communication devices that are user-specific are referred to as user equipment (UE).

In order to provide more and better wireless services, use of spectrum in higher frequencies is being explored. For example, use of portions of the millimeter wave (mmW) spectrum (which extends from 30 GHz to 300 GHz), is being considered for telecommunications applications.

Use of non-mmW spectrum may be restricted due to government regulation or other agreements. For example, different portions of the electromagnetic spectrum may be subject to license by a governmental entity. Spectrum licenses may be exclusive, or the spectrum may be shared. Additionally, some aspects of telecommunications devices may be subject to safety regulations. For example, some regulations place restrictions on the amount or other characteristics of transmission power.

SUMMARY

Methods, systems, and devices for wireless communication are described. The techniques allow for different configurations of uplink and downlink carriers; for example, in a system where downlink signals are in the mmW portion of the electromagnetic spectrum while uplink signals may be in non-mmW bands.

In general, in one aspect, a method of wireless communication performed by a user equipment (UE) in communication with a base station comprises receiving information indicative of a plurality of candidate uplink component carriers in the non-mmW spectrum, each of the plurality of candidate uplink component carriers available to be associated with a particular downlink component carrier in the mmW spectrum. In response to receiving the information indicative of the plurality of candidate uplink component carriers the UE can select at least a primary uplink component carrier from the plurality of candidate uplink component carriers. The UE can transmit a signal to the base station using the primary uplink component carrier.

The information indicative of a plurality of candidate uplink component carriers in the non-mmW spectrum may include at least frequency information (such as the center frequency of the candidate uplink component carrier), as well as one or more random access channel (RACH) parameters for each of the candidate uplink component carriers.

The UE can select at least a primary uplink component carrier from the plurality of candidate uplink component carriers by determining that a set S of candidate uplink component carriers are supported by the UE, where there are T candidate uplink component carriers. If all candidate carriers are supported, then S=T. If S>1, the primary uplink component carrier can be selected from the S supported candidate uplink component carriers based on one or more uplink communication parameters. The communication parameters include UE compatibility with each of the candidate uplink component carriers, a current load level of each of the S supported candidate uplink component carriers, an expected load level of each of the S supported candidate uplink component carriers, and an incumbent priority for each of the S supported candidate uplink component carriers. The UE can select at least one secondary uplink component carrier from the candidate uplink component carriers. In some implementations, the UE receives a configuration of one or more secondary uplink component carriers from the base station.

The UE transmits a capability report to the base station, where the capability report can include UE uplink carrier capability information. The UE may transmit control signaling and data to the base station using the primary uplink component carrier and transmit data to the base station using the one or more secondary uplink component carriers, although in some implementations the UE transmits some control information using the secondary uplink component carriers in addition to data. The control signaling can include downlink hybrid automatic repeat request (HARQ) information, channel state information (CSI), scheduling request (SR) information, and random access channel (RACH) information.

In general, a method of wireless communication performed by a base station in communication with a user equipment (UE) includes transmitting information indicative of a plurality of candidate non-mmW uplink component carriers to be paired with a particular downlink mmW component carrier. The base station receives an indication of a preferred uplink component carrier of the plurality of candidate uplink component carrier from the UE and selects the preferred uplink component carrier or a different uplink component carrier as an initial primary uplink component carrier for the UE, and configures the UE with the initial primary uplink component carrier.

The base station may select the different uplink component carrier as an initial primary uplink component carrier rather than the preferred uplink component carrier based on system parameters such as relative loading of the different uplink component carrier and the preferred uplink component carrier. For example, if loading of the preferred primary uplink component carrier is more than a threshold amount above loading of the different primary uplink component carrier, then the base station may select the different primary uplink component carrier for improved load balancing.

Aspects generally include methods, apparatus, systems, computer program products, and processing systems, as substantially described herein with reference to and as illustrated by the accompanying drawings.

Other aspects, features, and embodiments of the present invention will become apparent to those of ordinary skill in the art, upon reviewing the following description of specific, exemplary aspects of the present invention in conjunction with the accompanying figures. While features of the present disclosure may be discussed relative to certain aspects and figures below, all embodiments of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
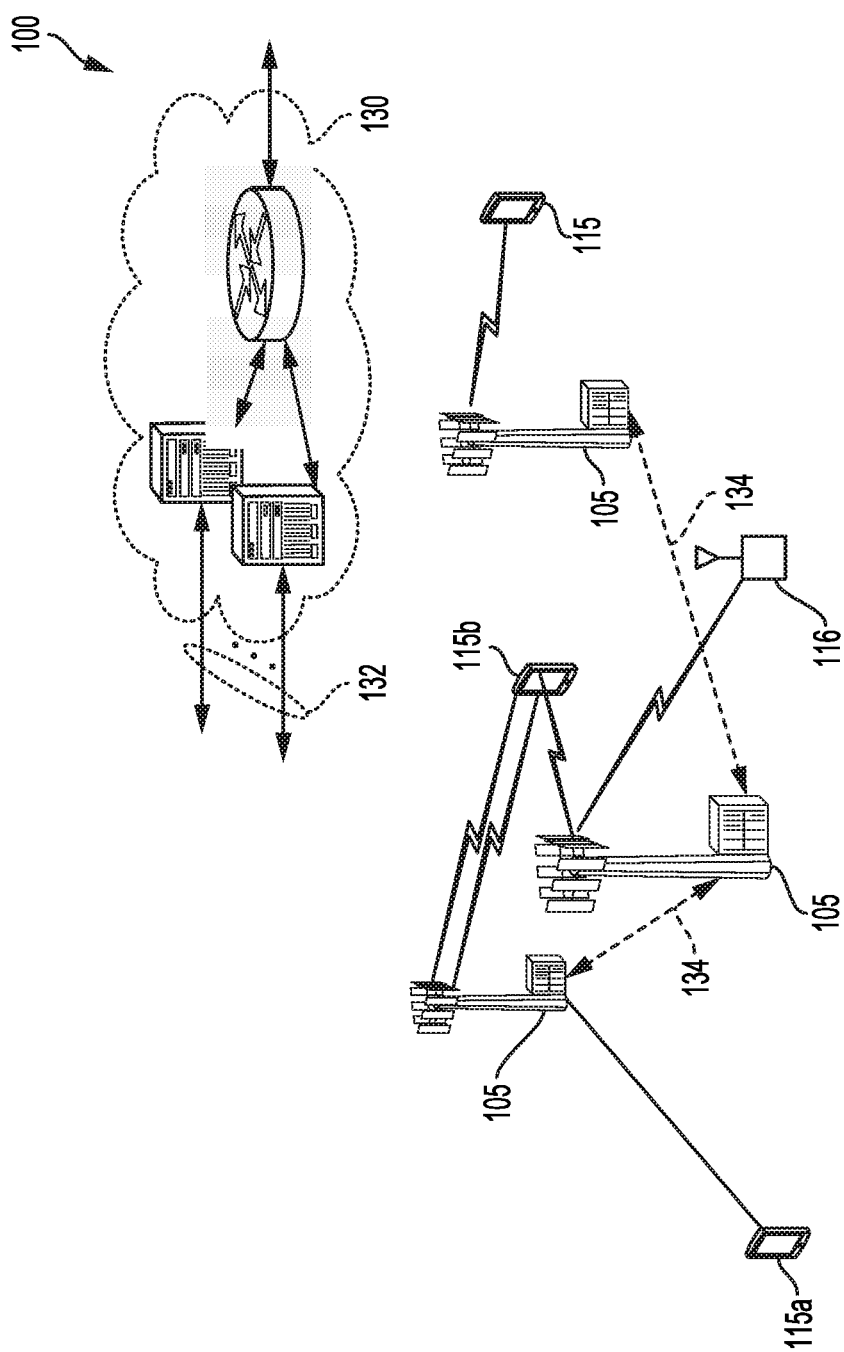
FIG. 1 illustrates an example of a wireless communications system according to some implementations.

While the expansion of telecommunications into new frequency regimes can provide a number of benefits, new frequency bands such as those associated with the millimeter wave portion of the electromagnetic spectrum present new challenges for devices and protocols.

One issue that may arise with new spectrum is the intersection of regulation with technology. For example, in the United States, some kinds of wireless devices need to comply with Maximum Permissible Exposure (MPE) restrictions. Depending on their use and configuration, some UEs may ensure compliance with MPE restrictions by using non-mmW carriers in the uplink (transmissions from the UE to the network entity) and using the mmW band exclusively on the downlink (transmissions from a network entity such as a base station to the UE). Other UEs may be designed to selectively use either mmW or non-mmW transmissions on the uplink. Devices that are not routinely proximate to a user's body, such as some Customer Premises Equipment (CPE), may be designed to use mmW spectrum for both uplink and downlink communications.

Systems and techniques herein use cross-band pairing of downlink mmW carriers with one or more non-mmW uplink carriers. Uplink carrier frequencies that are less than ten GHz can be used; in particular, the sub-6 GHz bands can mitigate regulatory concerns and are compatible with many UE designs. Examples of sub-6 GHz bands are 3.4-3.8 GHz, 3.8-4.2 GHz, and 4.4-4.9 GHz. Although using the sub-6 GHz bands on the uplink can be beneficial, some aspects of using the sub-6 GHz bands can be challenging. For example, although currently 5G NR (New Radio) supports up to 100 MHz carrier widths in the sub-6 GHz bands, a contiguous allotment may not be available since the sub-6 GHz band may be fragmented (the spectrum available for use may not be in a single contiguous band, but may be made up of smaller portions of spectrum). There are a number of reasons the available spectrum may be fragmented.

For a licensed band, a licensee may not have access to a contiguous allocation in the spectrum—for example, the licensee may have one allotment in one portion of the band and another allotment in a different portion of the band that is not contiguous with the first portion (or is in a different band). For an unlicensed portion of the non-mmW spectrum, medium sharing may result in a node with access to a non-contiguous uplink spectrum. For a shared portion of the non-mmW spectrum, protection of the existing incumbent (a prior user such as a governmental entity who has priority of shared spectrum) may result in a node with access to non-contiguous uplink spectrum.

In the current version of the 3GPP (3rd Generation Partnership Project) specification, a UE cannot be configured with more uplink component carriers than downlink component carriers. In order to provide efficient and compliant communication when using different spectrum on the uplink and on the downlink, systems and techniques for cross-band pairing described herein allow for pairing a non-mmW primary uplink component carrier and optionally one or more secondary uplink component carriers with a particular mmW downlink carrier. Herein, the phrase "component carrier" refers to a single carrier or one of a plurality of carriers for a carrier aggregation implementation, while cross-band pairing refers to association of one or more uplink carriers in non-mmW bands (e.g., one or more of the sub-6 GHz bands) paired with a single downlink carrier in a different spectrum band (e.g., the mmW band).

Some aspects that affect cross-band pairing are spectrum availability, spectrum use characteristics, and UE capability. As explained above, different telecommunications service providers may have limited available spectrum due to fragmentation. Even when a service provider is able to access particular portions of the spectrum, use characteristics such as loading may make some portions more or less desirable for a particular communication. Additionally, different UEs may also have different capabilities for supporting communications in different spectral regimes. For example, a service provider may have a first spectrum allotment in the sub-6 GHz spectrum with a first center frequency and a second spectrum allotment with a second higher center frequency, but a UE may only be able to support communications in the first spectrum allotment having the lower center frequency.

In some implementations, the cross-band pairing process may be mostly managed by a base station, while in others the UE may do some or all of the management. Examples of these implementations are described below with reference to the figures.

Systems and techniques for cross-band pairing are described with respect to example system 100 of FIG. 1. Wireless communications system 100 includes base stations 105, user devices (UEs) 115 (including UE 115*a* and UE 115*b*), CPE 116, and a core network 130. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc. In some examples, the wireless communications system 100 may be a Long Term Evolution (LTE)/LTE-Advanced (LTE-A) network, a 5G network, or a network that provides services with a combination of protocols.

In the example of FIG. 1, UE 115a is configured to communicate with base station 105. Each mmW downlink component carrier is paired with at least a primary uplink component carrier one or more uplink carriers. UE 115a is configured to use exclusively non-mmW carriers on the uplink. By contrast, UE 115b is configured to selectively use either non-mmW carriers in the uplink or mmW carriers in the uplink paired with received signals on mmW downlink carriers. CPE 116 is configured to pair uplink mmW signals with downlink mmW signals.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UE 115a and UE 115b and CPE 116, or may operate under the control of a base station controller (not shown). In some examples, base stations 105 may be macro cells, small cells, hot spots, or the like. Base stations 105 may also be referred to as eNodeBs (eNBs) or gNodeBs (gNBs) 105.

Figure 2A:
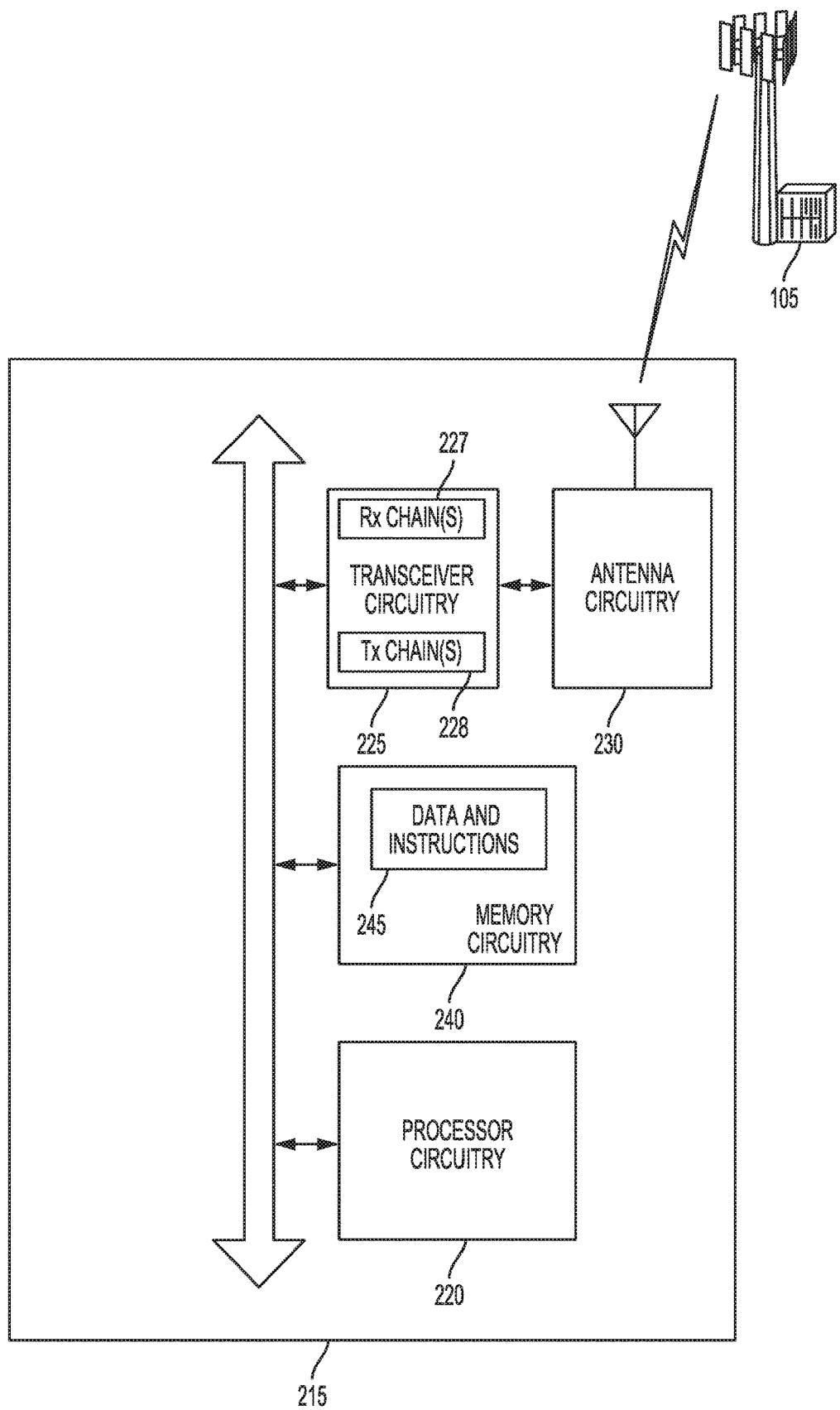
FIG. 2A illustrates an example of a wireless device according to some implementations.

FIG. 2A shows a simplified drawing of an example UE 115, referred to as UE 215. UE 215 includes antenna circuitry 230 and transceiver circuitry 225. Transceiver circuitry 225 includes receive circuitry with one or more receive (Rx) chains 227 having RF components such as amplifiers, analog to digital converters, mixers, oscillators, filters, etc. for processing received downlink signals, as well as transmit circuitry with one or more transmit (TX) chains 228 including RF components to generate signals to transmit on the uplink. Characteristics of the transceiver circuitry 225 for UE 215 can affect its ability to support particular uplink or downlink component carriers. UE 215 may support the entirety of available uplink non-mmW spectrum, or may support only part of the spectrum. For example, a particular UE design may have transmit chain(s) 228 that can support uplink signals in a first sub-6 GHz band but not a second sub-6 GHz band, or may support a portion but not all of a particular band. Similarly, the receive chain(s) 227 may support the entire width of the downlink mmW spectrum, or a portion.

UE 215 includes processor circuitry 220 and memory circuitry 240. Processor circuitry 220 and memory circuitry 240 are shown as discrete blocks, but may be implemented in a number of ways; for example, processor circuitry may be implemented in one or more dedicated areas of a chip or in different chips. Similarly memory circuitry 240 may be implemented as a main memory with or without the addition of other portions of memory circuitry on the same or different chips. For communications in the mmW spectrum, antenna circuitry 230 works with processor circuitry 220 and memory circuitry 240 to implement beam-related techniques such as beam scanning and management for communication with one or more base stations such as base station 105. Note that herein "processor circuitry" and "processor" are used to refer to structure.

UE 215 may store capability information as part of stored data and instructions 245 in memory circuitry 240. UE capability information may indicate support for communication using particular frequencies. In operation, UE 215 executes the techniques described below to implement cross-band pairing. For example, UE 215 may receive signals including information for a plurality of candidate uplink component carriers using antenna circuitry 230 and receive circuitry including receive chain(s) 227 of transceiver circuitry 225, described more fully below and in reference to FIG. 3. The information may be stored in memory circuitry 240 to be accessed and processed using processor circuitry 220. For example, processor circuitry 220 may select a preferred primary uplink component carrier and optionally one or more preferred secondary uplink component carriers using the techniques outlined below. Processor circuitry 220 may generate a message including a capability report, and may at times generate messaging indicating preference for different (updated) primary and/or secondary uplink component carriers. In other implementations, described more fully below and in reference to FIG. 4, UE 215 may receive signals including an initial configured primary uplink component carrier using antenna circuitry 230 and receive circuitry including receive chain(s) 227 of transceiver circuitry 225, while processor circuitry 220 generates a message including the capability report, as well as the other aspects described below.

Figure 2B:
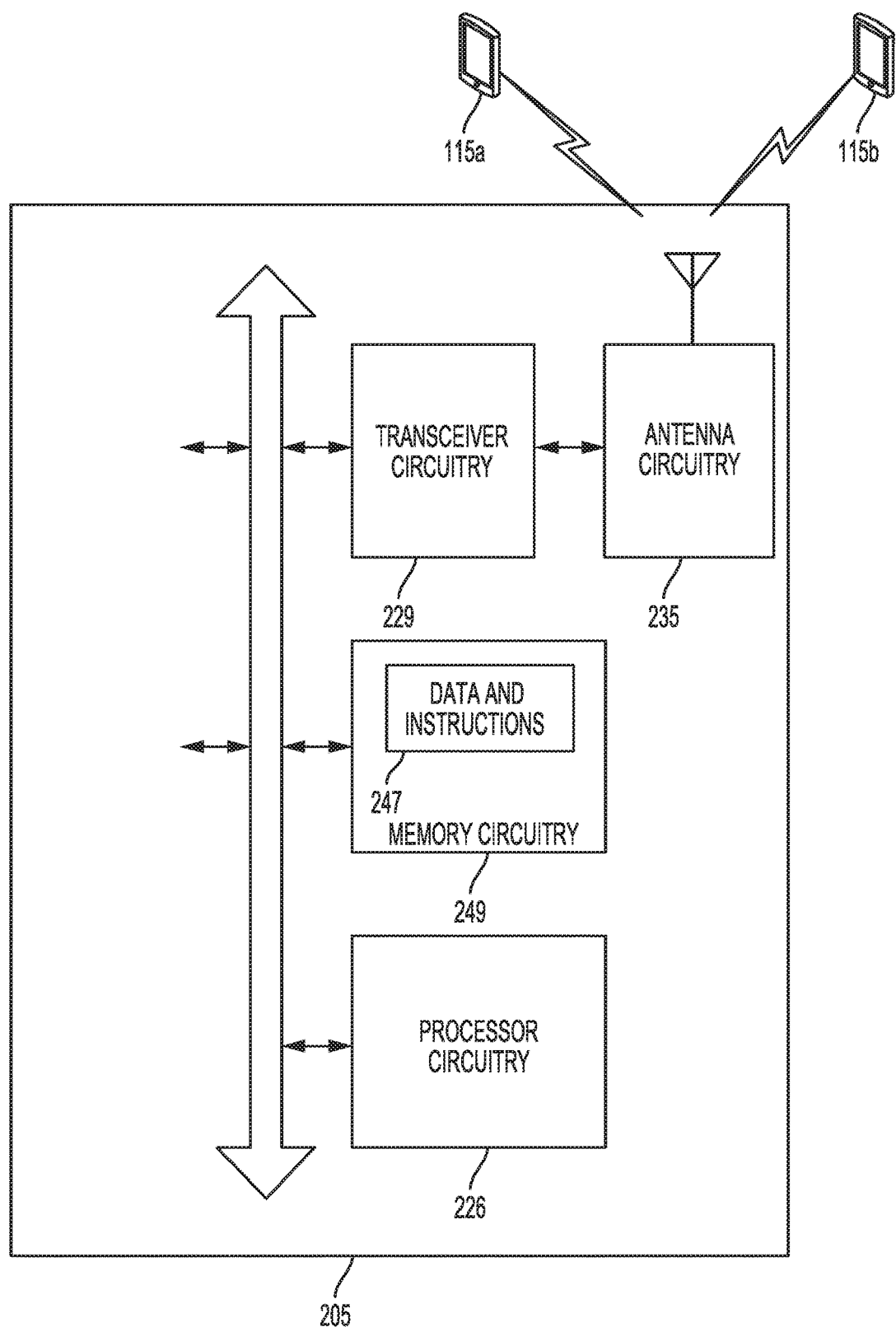
FIG. 2B illustrates an example of a base station according to some implementations.

FIG. 2B shows a simplified drawing of an example base station 205. Base station 205 may include processor circuitry 226, memory circuitry 249, antenna circuitry 235, and transceiver circuitry 229. As noted above, base station 205 can participate in communications with UEs such as UE 115a and UE 115b on a number of component carriers using associated cells. Here, the term "cell" being used to denote structure such as data and instructions 247 stored on memory circuitry 249 to generate signal information upon execution by processor circuitry 226, and transceiver circuitry 229 and antenna circuitry 235 transmitting the signals using the particular component carrier associated with the cell. In operation, base station 205 executes the techniques described below to implement cross-band pairing. For example, base station 205 may transmit information indicative of a plurality of candidate uplink component carriers using transmit circuitry of transceiver circuitry 229 and antenna circuitry 235, as described below and in FIG. 5. Base station 205 receives transmission from UEs such as UE 115 on a selected primary uplink component carrier (and/or an indication of a preference for a primary uplink component carrier), as well as a capability report for each UE, which can be stored in memory circuitry 249 and processed by processor circuitry 226 to determine uplink component carriers to be paired with a particular downlink carrier. Base station 205 and the UE communicate using the downlink component carrier and the one or more paired uplink component carriers. Base station 205 may optionally reconfigure the UE with a different (updated) primary uplink component carrier (and/or different secondary uplink component carrier(s)) during a connection. For example, base station 205 may improve load balancing among more than one communicating UEs by changing the component carriers for one or more connected UEs and/or by its configuration of component carriers to UEs as part of connection. In another implementation, as described below and in FIG. 6, base station 205 may transmit information of initial configured primary uplink component carrier using antenna circuitry 235 and transceiver circuitry 229, and enter a connected station using the initial configured primary uplink component carrier. Upon receiving a capability report from the UE, the base station may optionally configure UE with one or more secondary component carriers and may at some point optionally reconfigure the UE with a different primary uplink component carrier.

Figure 3:
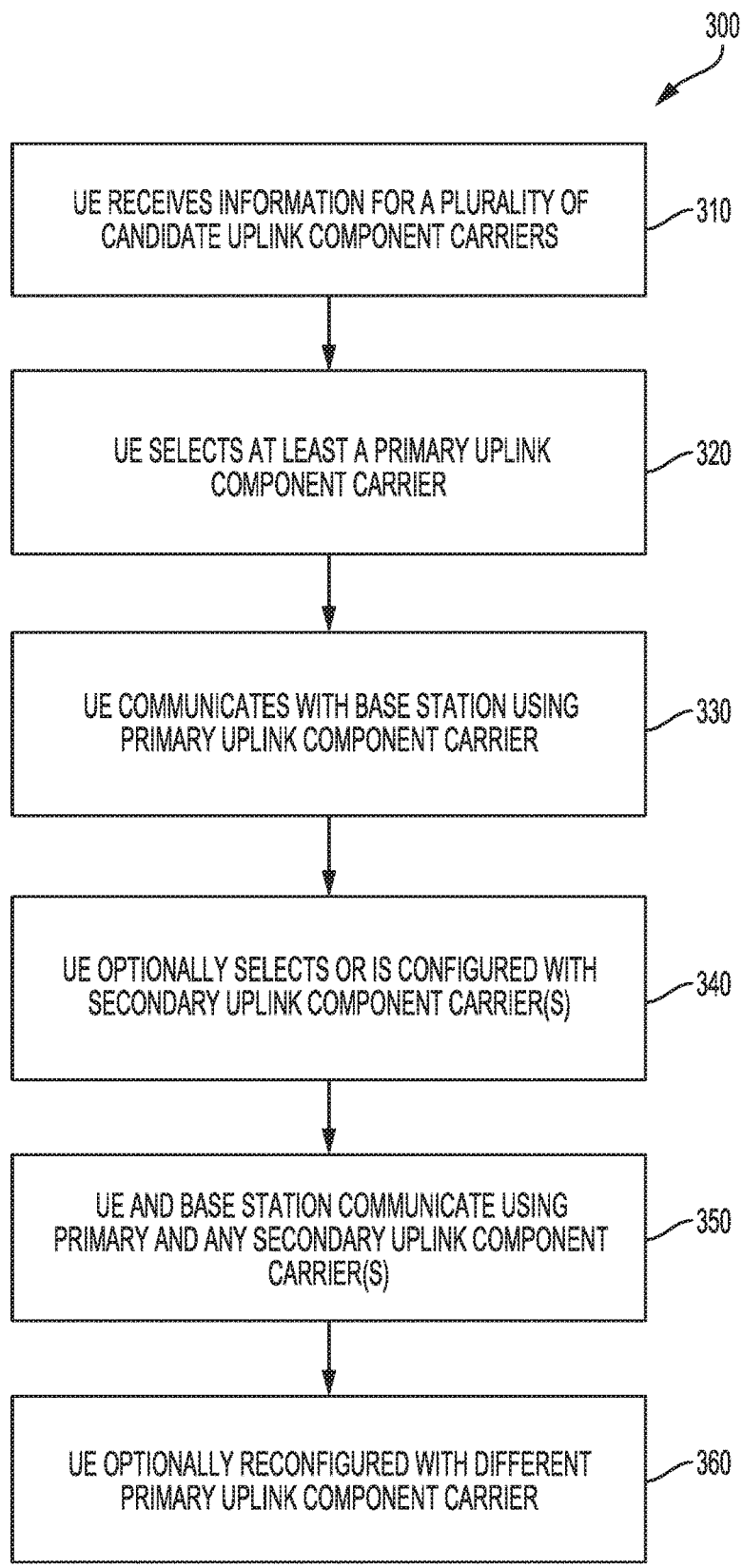
FIG. 3 illustrates an example method for a UE according to some implementations.

FIG. 3 shows a flow diagram for a method 300 that may be used for a UE 115 to communicate with a base station 105 using a connection that includes one or more uplink sub-mmW carriers paired with a particular downlink mmW component carrier. Method 300 is managed at least partially by UE 115, so that it can autonomously select at least a primary uplink component carrier from a plurality of candidate uplink component carriers.

At 310, UE 115 receives information indicative of a plurality of candidate uplink component carriers from a base station 105. For example, in establishing a connection, a particular gNB advertises more than one sub-6 GHz uplink component carrier to pair with a particular mmW downlink component carrier. The received information includes identification of each of the candidate uplink component carriers (e.g., frequency information such as its center frequency). In some implementations, random access channel (RACH) parameters for each candidate uplink component carrier are also included in the advertisement of the candidate uplink component carriers. If base station 105 is going to use carrier aggregation on the downlink (either with multiple cells of one base station or cells from more than one base station), UE 115 may receive information indicative of a plurality of candidate uplink component carriers for some or all of the downlink component carriers, although the information can be provided at different times and need not come from a single base station 105.

At 320, in response to receiving the information, UE 115 selects at least a primary uplink component carrier that complies with the capabilities of UE 115 and optionally communicates an indication of the preferred primary uplink component carrier to base station 105. For example, if UE 115 supports some but not all uplink center frequencies, UE 115 will select a primary uplink component carrier from a group of S supported carriers of the total T candidate uplink component carriers. If UE 115 supports more than one of the candidate uplink carriers, the UE may choose a primary uplink component carrier based on some aspect that makes one or more component carriers preferable compared to other candidate uplink component carriers, or it may choose from among the supported candidate uplink component carriers at random or in some other way that is not based on the characteristics of the candidate uplink component carriers (e.g., random selection).

For example, in some embodiments UE 115 selects the primary uplink component carrier based on one or more uplink communication parameters that can make a particular candidate uplink component carrier preferable to other candidate uplink component carriers. The uplink communication parameters include compatibility with the UE 115, relative current/expected load levels for the candidate uplink component carriers, incumbent access to the candidate uplink component carriers, or other parameters.

One parameter that may be used to select at least a primary uplink component carrier is the compatibility of the UE with the candidate uplink component carriers. Some candidate uplink component carriers may be more compatible with the particular configuration of UE 115. For example, the UE may be capable of supporting both first and second candidate uplink component carriers, but its RF design may be better suited to processing the center frequency of the first candidate uplink component carrier. Another parameter that may be used to select at least a primary uplink component carrier may be a consideration of the current and/or expected load of the candidate uplink component carriers. For example, UE 115 may use media sensing to determine carrier loading. If UE 115 observes a lower load on the first candidate uplink component carrier compared to the second candidate uplink component carrier, it may select the first candidate uplink carrier. Another parameter that may be used to select at least a primary uplink component carrier may be incumbent access to the different carriers. For example, if an incumbent has priority for the first candidate uplink component carrier but not the second candidate uplink component carrier, UE 115 may select the second candidate uplink component carrier.

At 330, UE 115 communicates with base station 105 by transmitting a signal to base station 105; for example, using the selected primary uplink component carrier. During communication with base station 105, UE 115 sends a UE capability report including UE uplink carrier capability information using the initial selected primary uplink component carrier. Base station 105 may use the UE capability report to configure one or more secondary uplink component carriers, or to reconfigure the primary uplink component carrier, as described in more detail below in reference to FIG. 4.

At 340, UE 115 may select or be configured with one or more secondary uplink component carriers paired to the downlink mmW carrier. If UE 115 selects secondary uplink component carrier(s) paired to the downlink mmW carrier, it can notify base station 105 as part of its signaling, or in some implementations it may be able to notify base station 105 implicitly by communicating with base station 105 using the secondary uplink component carrier(s).

At 350, UE 115 and base station 105 communicate using the downlink mmW component carrier paired with the primary uplink component carrier and optionally one or more secondary uplink component carriers. In some implementations, UE 115 may transmit control signaling on the primary uplink component carrier and use both primary and secondary component carriers for data transmission. Control signaling that is transmitted on the primary uplink component carrier can include downlink HARQ (hybrid automatic repeat request) information, CSI (channel state information), scheduling request (SR) information, and RACH signaling.

At 360, at a later time, UE 115 may optionally select and/or be reconfigured with a different primary uplink component carrier. For example, UE 115 may select a different primary uplink component carrier based on changes in communication parameters (such as a changing in loading for different uplink component carriers). UE 115 may indicate a preferred primary uplink component carrier to base station 105, and may be reconfigured to that preferred primary uplink component carrier if appropriate. Base station 105 may reconfigure UE 115 based on communication conditions (e.g., load balancing among carriers).

Figure 4:
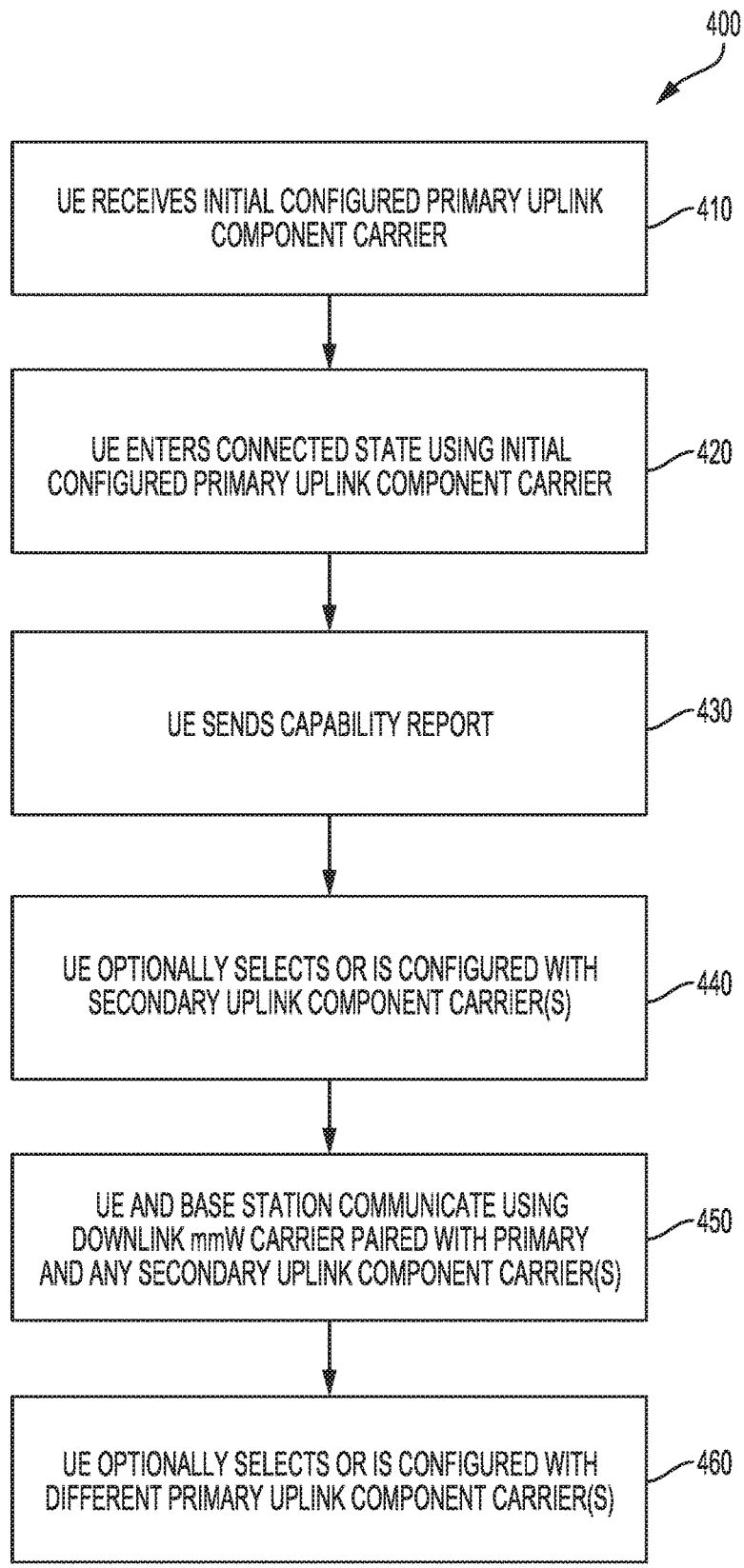
FIG. 4 illustrates an example method for a UE according to some implementations.

FIG. 4 shows a flow diagram for a method 400 that may be used for a UE 115 to communicate with a base station 105 using a connection that includes one or more uplink component carriers in a non-mmW band such as the sub-6 GHz bands paired with a particular downlink mmW component carrier. Method 400 is an implementation that is managed at least partially by base station 105. For example, a gNB identifies at least an initial configured primary uplink component carrier from its allotted spectrum, and advertises a single "paired" uplink component carrier and its corresponding RACH parameters in a transmission to a UE.

At 410, UE 115 receives information indicative of an initial configured non-mmW primary uplink component carrier from a base station 105 for a pairing with a particular downlink mmW component carrier. The received information includes identification of the initial configured primary uplink component carrier such as its center frequency and/or other frequency information, as well as RACH parameters for the primary uplink component carrier.

At 420, in response to receiving the information, UE 115 enters a connected state using the initial configured primary uplink component carrier. At 430, UE 115 sends a UE capability report including UE uplink carrier capability information to base station 105 using the initial configured primary uplink component carrier. At 440, UE 115 may select or be configured with one or more secondary uplink component carriers paired to the downlink mmW carrier. For example, base station 105 may access the received UE uplink carrier capability information and determine that UE 115 can support more than one uplink component carrier, and in response configure at least one secondary uplink component carrier for UE 115 to use on the uplink.

At 450, UE 115 and base station 105 communicate using the downlink mmW component carrier paired with the primary uplink component carrier and optionally one or more secondary uplink component carriers. In some implementations, UE 115 may transmit control signaling on the primary uplink component carrier and use both primary and secondary component carriers for data transmission. Control signaling that is transmitted on the primary uplink component carrier can include downlink HARQ (hybrid automatic repeat request) information, CSI (channel state information), scheduling request (SR) information, and RACH signaling.

At 460, UE 115 may select and/or be configured with a different primary uplink component carrier at a later time. For example, UE 115 may indicate a preference for a different primary uplink component carrier (e.g., based on changes in communication parameters such as a changing in loading for different uplink component carriers). UE 115 may indicate a preferred primary uplink component carrier to base station 105, and may be reconfigured to that preferred primary uplink component carrier if appropriate. Base station 105 may reconfigure UE 115 based on communication conditions (e.g., load balancing among carriers).

Figure 5:
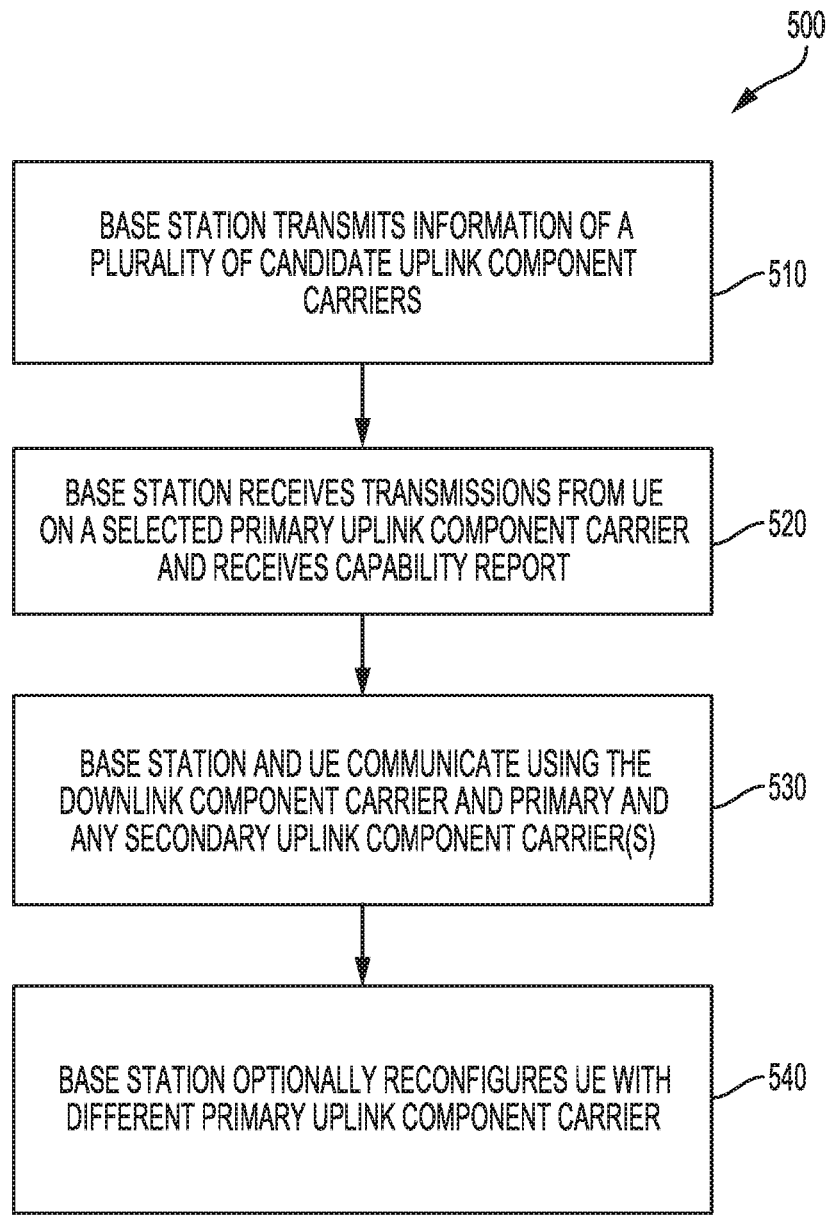
FIG. 5 illustrates an example method for a base station according to some implementations.

FIG. 5 shows a flow diagram for a method 500 that may be used for a base station 105 to communicate with a UE 115 using a connection that includes one or more uplink sub-mmW carriers paired with a particular downlink mmW component carrier. Method 500 is managed at least partially by UE 115, so that it can autonomously select at least a primary uplink component carrier from a plurality of candidate uplink component carriers.

At 510, base station 105 transmits information indicative of a plurality of non-mmW candidate uplink component carriers to UE 115. Base station 105 is associated with a particular telecommunications service provider, and can select candidate uplink component carriers from one or more of (1) licensed spectrum allotment(s), (2) shared spectrum portion(s), and (3) unlicensed spectrum portions. For example, in establishing a connection, a particular gNB determines a plurality of sub-6 GHz uplink component carriers and advertises the candidate uplink component carriers to UE 115 to pair with a particular mmW downlink component carrier.

At 520, base station 105 receives a transmission from UE 115 on a selected preferred primary uplink component carrier of the plurality of candidate uplink component carriers, and may receive an indication of the preferred primary uplink component carrier. During communication with UE 115, base station 105 receives a UE capability report including UE uplink carrier capability information. Base station 105 may configure UE 115 with the preferred primary uplink component carrier or in some cases a different primary uplink component carrier. For example, base station 105 may configure UE 115 with a different primary uplink component carrier if the different primary uplink component carrier is supported by UE 115 but improves load balancing. Base station 105 may choose the different primary component carrier based on relative loading of the different uplink component carrier and the preferred uplink component carrier. Base station 105 may use the UE capability report to configure one or more secondary uplink component carriers, or to reconfigure the primary uplink component carrier.

At 530, base station 105 and UE 115 communicate using the downlink mmW component carrier paired with the primary uplink component carrier and optionally one or more secondary uplink component carriers. In some implementations, base station 105 may receive control signaling on the primary uplink component carrier and data transmissions on both primary and secondary component carriers for data transmission from UE 115.

At 540, at a later time, UE 115 may optionally be reconfigured with a different primary uplink component carrier. For example, UE 115 may prefer a different primary uplink component carrier based on changes in communication parameters (such as a changing in loading for different uplink component carriers or other aspects such as a received signal strength indicator (RSSI)). UE 115 may indicate a preferred primary uplink component carrier to base station 105, and may be reconfigured to that preferred primary uplink component carrier if appropriate. Base station 105 may reconfigure UE 115 based on communication conditions (e.g., load balancing among carriers).

Figure 6:
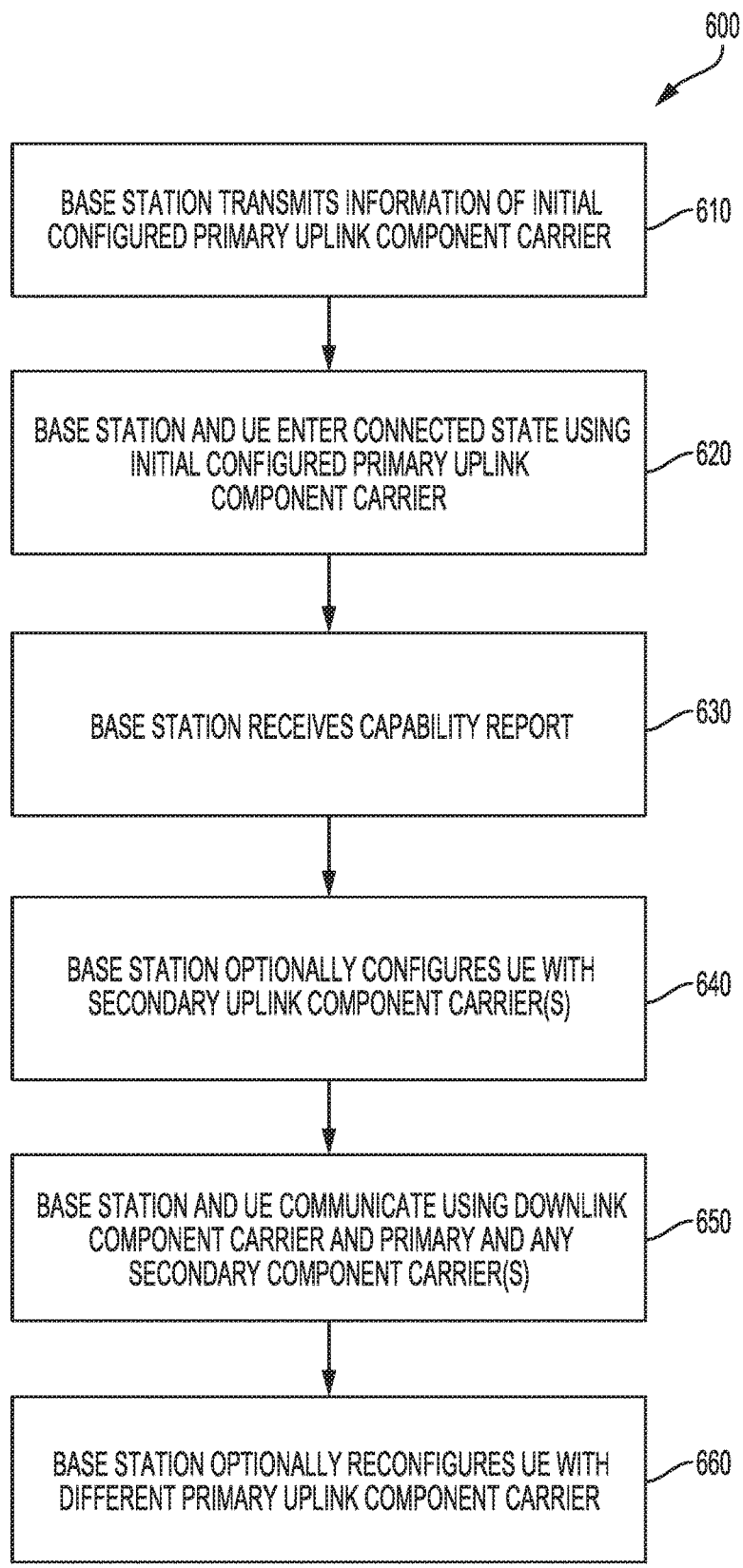
FIG. 6 illustrates an example method for a base station according to some implementations.

FIG. 6 shows a flow diagram for a method 600 that may be used for a base station 105 to communicate with a UE 115 using a connection that includes one or more uplink component carriers in a non-mmW band such as the sub-6 GHz bands paired with a particular downlink mmW component carrier. Method 600 is an implementation that is managed at least partially by base station 105. For example, a gNB identifies at least an initial configured primary uplink component carrier from available spectrum, and advertises a single "paired" uplink component carrier and its corresponding RACH parameters in a transmission to a UE.

At 610, base station 105 transmits information indicative of an initial configured non-mmW primary uplink component carrier to UE 115 for a pairing with a particular downlink mmW component carrier. The transmitted information includes identification of the initial configured primary uplink component carrier such as its center frequency and/or other frequency information, as well as RACH parameters for the primary uplink component carrier.

At 620, in response to receiving the information, base station 105 and UE 115 enter a connected state using the initial configured primary uplink component carrier. At 630, base station 105 receives a UE capability report including UE uplink carrier capability information to base station 105 using the initial configured primary uplink component carrier. At 640, base station 105 may optionally configure UE 115 with one or more secondary uplink component carriers paired to the downlink mmW carrier.

At 650, UE 115 and base station 105 communicate using the downlink mmW component carrier paired with the primary uplink component carrier and optionally one or more secondary uplink component carriers. As noted above, UE 115 may transmit control signaling on the primary uplink component carrier and use both primary and secondary component carriers for data transmission. Control signaling that is transmitted on the primary uplink component carrier can include downlink HARQ information, CSI, SR information, and RACH signaling.

At 660, base station 105 may optionally reconfigure UE 115 with a different primary uplink component carrier at a later time. For example, base station 105 may receive an indication from UE 115 of a preference for a different primary uplink component carrier (e.g., based on changes in communication parameters such as a changing in loading for different uplink component carriers). If the preferred primary uplink component carrier is appropriate (e.g., not overloaded), base station 105, and may reconfigure the UE 115 to use that preferred primary uplink component carrier. In some implementations, base station 105 may reconfigure UE 115 to use a different primary uplink component carrier without an indication for UE preference; for example, in order to balance loads among a carriers.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A computer storage medium may be any available medium that can be accessed by a general purpose or special purpose computer but the phrase "computer storage medium" does not refer to a transitory propagating signal. By way of example, and not limitation, computer storage media can comprise RAM, ROM, electrically erasable programmable read only memory (EEPROM), compact disk (CD) ROM or other optical disk storage, magnetic disk storage or other magnetic storage devices, or other medium that can be used to store desired program code means in the form of instructions or data structures and that can be accessed by a general-purpose or special-purpose computer, or a general-purpose or special-purpose processor. Also, a connection that transmits information is referred to as a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium.

The techniques herein are described with reference to systems that use wide bands, such as 5G or new radio (NR) systems and future systems that use spectrum in the mmW range of the electromagnetic spectrum. If applicable, techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes a 5G system for purposes of example, and 5G terminology is used in much of the description above, although the techniques are applicable beyond 5G applications.

Base stations may include or may be referred to by those skilled in the art as a base transceiver station, a radio base station, an access point (AP), a radio transceiver, a NodeB, eNodeB (eNB), Home NodeB, a Home eNodeB, gNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for carrier aggregation signaling. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same or similar reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication performed by a user equipment (UE) in communication with a base station, the method comprising:
   receiving information indicative of a plurality of candidate uplink component carriers in the non-mmW (millimeter wave) spectrum, each of the plurality of candidate uplink component carriers available to be associated with a particular downlink component carrier in the mmW spectrum;
   in response to receiving the information indicative of the plurality of candidate uplink component carriers, selecting at least a primary uplink component carrier from the plurality of candidate uplink component carriers; and
   transmitting a signal to the base station using the primary uplink component carrier.

2. The method of claim 1, wherein receiving information indicative of a plurality of candidate uplink component carriers in the non-mmW spectrum comprises receiving at least frequency information and one or more random access channel (RACH) parameters for each of the candidate uplink component carriers.

3. The method of claim 1, wherein selecting at least a primary uplink component carrier from the plurality of candidate uplink component carriers comprises determining that a set S of candidate uplink component carriers supported by the UE from the total T candidate uplink component carriers are supported by the UE.

4. The method of claim 3, wherein S is greater than one, and further comprising selecting the primary uplink component carrier from the S supported candidate uplink component carriers based on one or more uplink communication parameters.

5. The method of claim 4, wherein the one or more uplink communication parameters include at least one parameter selected from the group consisting of UE compatibility with each of the candidate uplink component carriers, a current load level of each of the S supported candidate uplink component carriers, an expected load level of each of the S supported candidate uplink component carriers, and an incumbent priority for each of the S supported candidate uplink component carriers.

6. The method of claim 1, further comprising selecting at least one secondary uplink component carrier from the candidate uplink component carriers.

7. The method of claim 1, wherein transmitting the signal to the base station using the primary uplink component carrier comprises comprising transmitting a UE capability report to the base station using the primary uplink component carrier, the UE capability report including UE uplink carrier capability information.

8. The method of claim 7, further comprising receiving a configuration of one or more secondary uplink component carriers associated with the particular downlink component carrier after transmitting the UE capability report to the base station.

9. The method of claim 8, further comprising transmitting control signaling and data to the base station using the primary uplink component carrier and transmitting data to the base station using the one or more secondary uplink component carriers.

10. The method of claim 7, further comprising receiving a configuration of an updated primary uplink component carrier.

11. The method of claim 10, further comprising, transmitting control information to the base station using the updated primary uplink component carrier subsequent to receiving the configuration of the updated primary uplink component carrier.

12. The method of claim 1, further comprising transmitting an indication to indicate a preferred uplink component carrier to use as the primary uplink component carrier.

13. A user equipment (UE) for wireless communication comprising:
means for receiving information indicative of a plurality of candidate uplink component carriers in the non-mmW spectrum, each of the plurality of candidate uplink component carriers available to be associated with a particular downlink component carrier in the mmW spectrum;
means for selecting at least a primary uplink component carrier from the plurality of candidate uplink component carriers in response to receiving the information indicative of the plurality of candidate uplink component carriers; and
means for transmitting a signal to a base station using the primary uplink component carrier.

14. The user equipment of claim 13, wherein the means for receiving information indicative of a plurality of candidate uplink component carriers in the non-mmW spectrum comprises means for receiving at least frequency information and one or more random access channel (RACH) parameters for each of the candidate uplink component carriers.

15. The user equipment of claim 13, wherein the means for selecting at least a primary uplink component carrier from the plurality of candidate uplink component carriers comprises means for determining that a set S of candidate uplink component carriers supported by the UE from the total T candidate uplink component carriers are supported by the UE.

16. The user equipment of claim 15, wherein S is greater than one, and further comprising means for selecting the primary uplink component carrier from the S supported candidate uplink component carriers based on one or more uplink communication parameters.

17. The user equipment of claim 16, wherein the one or more uplink communication parameters include at least one parameter selected from the group consisting of UE compatibility with each of the candidate uplink component carriers, a current load level of each of the S supported candidate uplink component carriers, an expected load level of each of the S supported candidate uplink component carriers, and an incumbent priority for each of the S supported candidate uplink component carriers.

18. The user equipment of claim 13, further comprising means for selecting at least one secondary uplink component carrier from the candidate uplink component carriers.

19. A user equipment (UE) comprising:
receive circuitry configured to receive mmW signals on one or more downlink mmW carriers;
memory circuitry configured to store received information indicative of a plurality of candidate uplink component carriers in the non-mmW spectrum, each of the plurality of candidate uplink component carriers available to be associated with a particular downlink component carrier;
processor circuitry configured to access the information indicative of the plurality of candidate uplink component carriers and to select at least a primary uplink component carrier; and
transmit circuitry configured to transmit a signal to a base station using the primary uplink component carrier.

20. The user equipment of claim 19, wherein the information indicative of a plurality of candidate uplink component carriers in the non-mmW spectrum comprises at least frequency information and one or more random access channel (RACH) parameters for each of the candidate uplink component carriers.

21. The user equipment of claim 19, wherein the processor circuitry is configured to select the at least a primary uplink component carrier from the plurality of candidate uplink component carriers from a set S of candidate uplink component carriers supported by the UE from a total T candidate uplink component carriers are supported by the UE.

22. The user equipment of claim 21, wherein S is greater than one, and wherein the processor circuitry is configured to select the primary uplink component carrier from the S supported candidate uplink component carriers based on one or more uplink communication parameters.

23. The user equipment of claim 22, wherein the one or more uplink communication parameters include at least one parameter selected from the group consisting of UE compatibility with each of the candidate uplink component carriers, a current load level of each of the S supported candidate uplink component carriers, an expected load level of each of the S supported candidate uplink component carriers, and an incumbent priority for each of the S supported candidate uplink component carriers.

24. The user equipment of claim 19, wherein the processor circuitry is further configured to select at least one secondary uplink component carrier from the candidate uplink component carriers.

25. The user equipment of claim 19, wherein the processor circuitry is further configured to generate a message to be transmitted to the base station, the message comprising a UE capability report including UE uplink carrier capability information.

* * * * *